United States Patent [19]

Kildune

[11] Patent Number: 5,483,890

[45] Date of Patent: Jan. 16, 1996

[54] DIRECT APPLIED EMBOSSING CASTING METHODS

[75] Inventor: Joseph S. Kildune, Salem, N.H.

[73] Assignee: GenCorp Inc., Fairlawn, Ohio

[21] Appl. No.: 404,220

[22] Filed: Mar. 15, 1995

[51] Int. Cl.$^6$ .................. B41F 1/28; B29C 33/40
[52] U.S. Cl. ............ 101/401.1; 264/219; 264/227; 264/294; 264/313; 29/895.32; 29/895.33
[58] Field of Search ............. 101/401.1; 264/219, 264/226, 227, 294, 313; 29/895.3, 895.32, 895.33

[56] References Cited

U.S. PATENT DOCUMENTS

| | | | |
|---|---|---|---|
| 2,019,590 | 11/1935 | Westra . | |
| 2,218,227 | 10/1940 | Winnek . | |
| 2,316,143 | 4/1943 | Peebles et al. . | |
| 2,849,752 | 9/1958 | Leary . | |
| 3,551,177 | 12/1970 | Hechtman et al. . | |
| 3,552,710 | 1/1971 | Roosen | 249/83 |
| 3,839,120 | 10/1974 | Killan | 156/245 |
| 3,843,763 | 10/1974 | Coll-Palagos | 264/219 |
| 3,869,535 | 3/1975 | Coll-Palagos | 264/219 |
| 4,017,581 | 4/1977 | Amidon | 264/220 |
| 4,158,073 | 6/1979 | Schneider et al. | 427/195 |
| 4,202,716 | 5/1980 | Roman | 156/79 |
| 4,250,135 | 2/1981 | Orsini | 264/227 |
| 4,285,274 | 8/1981 | Katsuuma | 101/128.4 |
| 4,389,116 | 6/1983 | Vogel | 355/85 |
| 4,608,108 | 8/1986 | Goll | 156/219 |
| 4,609,514 | 9/1986 | Kyle et al. | 264/153 |
| 4,634,484 | 1/1987 | Wagner | 156/219 |
| 5,057,258 | 10/1991 | Scuri | 264/138 |
| 5,261,984 | 11/1993 | Minnick et al. | 156/209 |
| 5,266,257 | 11/1993 | Kildune | 264/224 |
| 5,327,825 | 7/1994 | Parker et al. | 101/401.1 |

*Primary Examiner*—Eugene H. Eickholt
*Attorney, Agent, or Firm*—Robert F. Rywalski; David A. Spenard

[57] ABSTRACT

This invention relates to a method of creating a seamless printing master for use with an embossing roll to ultimately produce a textured wall or floor covering. A hardenable material is applied to the textured surface of a positive printing master section. The positive printing master section is pressed onto the embossing roll and the hardenable material is allowed to cure to a hardened state. The positive printing master section is then removed to expose a negative printing master region which is the negative image of the pattern contained in the positive printing master section, imprinted in hardened material, and adhered to the embossing roll. The process is repeated, either reusing the original positive printing master section or using a different positive printing master section, overlapping positive printing master sections onto previously formed negative printing master regions until the entire outer surface of the embossing roll is covered. The result is a seamless negative printing master imprinted in hardened material and firmly affixed to the embossing roll which can then be used in a conventional embossing process to create a textured wall or floor covering. The hardened material may then be removed from the embossing roll so that the embossing roll can be reused.

15 Claims, 2 Drawing Sheets

DIRECT APPLIED EMBOSSING CASTING METHODS

FIELD OF THE INVENTION

The present invention relates to the production of textured wall or floor coverings. More specifically, the present invention relates to a convenient and inexpensive method of creating a quality seamless printing master for use on an embossing roll to imprint sheets of such coverings.

BACKGROUND OF THE INVENTION

In the manufacture of wall and floor coverings, it is sometimes desirable to impart a textured surface thereto in the form of a decorative embossing. One method of attaining such decorative embossing is to employ an embossing roll, usually made of metal, to transfer the desired pattern or texture to the substrate material.

When a metal embossing roll is utilized, there are several methods of imparting the desired design or texture onto the roll. For example, the pattern or texture can be cut into the outer surface of the roll using a machine process (such as die-and-mill) or a chemical process (such as photoetching). Any process, including the two mentioned, which cuts into the outer surface of the embossing roll, is extremely expensive and time consuming. Skilled technicians must be employed to execute the numerous stages required to prepare the roll, which can take months to complete.

Further, such a process is also time consuming and expensive to reverse, making it difficult to reuse the embossing roll. Making a previously cut or etched embossing roll ready for reuse involves either "turning down" the roll (i.e., shaving away the outer surface until the cut areas are eliminated and the outer surface is smooth) or adding material to the roll, so that the cut areas are filled. If the embossing roll is turned down, enough of the roll will eventually be trimmed away so that it will become impossible to reuse the roll. If the previously cut areas are filled in, it is sometimes difficult to achieve the smooth outer surface necessary for subsequent cutting or etching operations.

SUMMARY OF THE INVENTION

The present invention relates to a method of creating a seamless printing master for use with an embossing roll to ultimately produce a textured wall or floor covering. A hardenable material is applied to the textured surface of a positive printing master section. The positive printing master section is pressed onto the embossing roll and the hardenable material is allowed to cure to a hardened state. The positive printing master section is then removed to expose a negative printing master region which is the negative image of the pattern contained in the positive printing master section, imprinted in the hardened material, and firmly adhered to the embossing roll. The process is repeated, either reusing the original positive printing master section or using a different positive printing master section, overlapping each subsequent positive printing master section onto previously formed negative printing master regions until the entire outer surface of the embossing roll is covered with overlapping negative printing master regions. The result is a seamless negative printing master imprinted in hardened material and firmly affixed to the embossing roll. The embossing roll can then be used in a conventional embossing process to create a textured wall or floor covering. The hardened material may then be removed from the embossing roll so that the embossing roll can be reused.

In an alternate embodiment, the first positive printing master section is made large enough to cover all of the outer surface of the embossing roll except for a narrow gap where the leading and trailing edges near each other. Smaller positive printing master sections are then used as in the previously described process to fill in the gap area.

The present invention offers numerous advantages over the previous methods of creating textured wall and floor coverings using an embossing roll. First, the artist is allowed to have much more creative input into the process. The artist himself actually creates the positive printing master section to be used, as opposed to instructing a technician to prepare the embossing roll using conventional cutting or etching methods. If the artist is not satisfied with the finished negative printing master formed on the outer surface of the embossing roll, he may simply remove the hardened material and start again.

Next, and perhaps more importantly, the instant process allows the metal embossing rolls to be reused virtually indefinitely. When the desired amount of a particular wall or floor covering has been manufactured, it is a simple process to remove the hardened material from the embossing roll and start another production run after creating a new negative printing master (having a different textured surface than the previous run). This eliminates the need to "turn down" the metal embossing roll after each use. By eliminating the process of turning down the embossing roll, the need to dispose of potentially dangerous metal shavings is also eliminated, a concern which is not insignificant in today's environmentally conscious society.

Another advantage of the present method is reduced time to prepare an embossing roll for a production run. Whereas a photoetching or gravure process could take a matter of months, the direct applied embossing casting method takes a matter of weeks. As for expense, the cost of the hardenable material plus the time of the artist to use it is significantly cheaper than the cost of currently used processes plus the time of skilled technicians to implement them.

Accordingly, it is an object of the present invention to provide a new, easy-to-use method of creating a seamless printing master for use on an embossing roll to ultimately produce textured wall or floor coverings.

It is a further object of the present invention to provide a method of creating a seamless printing master which allows the embossing roll to be reused repeatedly.

It is a yet further object of the present invention to provide a method of creating a seamless printing master where the artist has a high degree of creative input into the forming of the positive printing master sections.

For a further understanding of the present invention and the objects thereof, attention is directed to the drawings and the following brief description thereof, to the detailed description of the preferred embodiment, and to the appended claims.

DETAILED DESCRIPTION OF THE PREFERRED EMBODIMENT

First, the artist creates positive printing master section 110 having a textured surface 115. This can be accomplished, in the preferred embodiment, by starting with a substrate made of a vinyl material or the like. The substrate may then be heated, stretched, deformed, imprinted, or shaped by any other process to create the desired pattern. The pattern may be symmetrical or not, free-form abstract or pictorially representative, being limited only by the imagination of the artist and the physical properties of the substrate material. In short, the artist may use any of a variety of methods to create any desired pattern which ultimately results in positive printing master section 110 to be used in conjunction with standard embossing roll 100. The artist may create multiple positive printing master sections having different patterns so that the overall pattern of the wall or floor covering is varied, or he may use a single positive printing master section repeatedly to cover the outer surface 130 of embossing roll 100 to produce a consistent overall effect. Of course, as an alternative to creating original positive printing master sections, the artist may obtain premade ones and use them in same way as he would use originals in the method described below.

Figure 1:
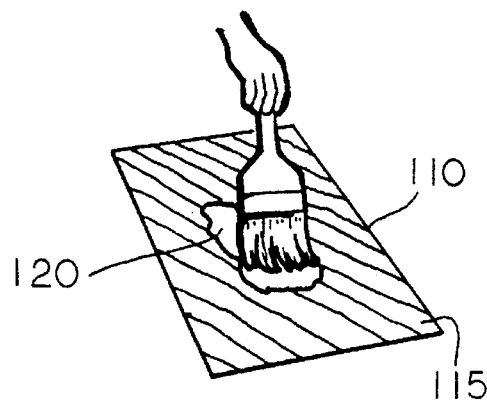
FIG. 1 is a perspective view of the first positive printing master section of the preferred method where the hardenable material is being applied to the first positive printing master section.
Figure 2:
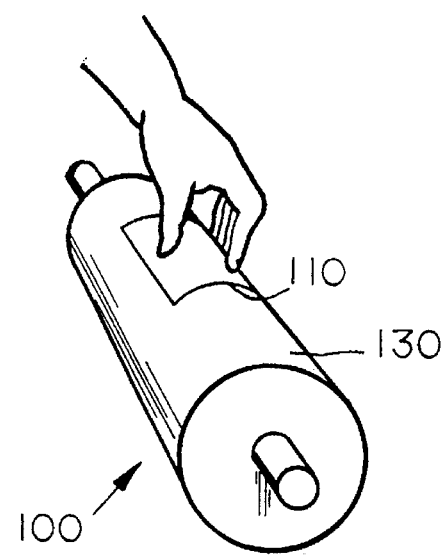
FIG. 2 is a perspective view of the embossing roll of the preferred method where the first positive printing master section is being applied to the outer surface of the embossing roll.
Figure 3:
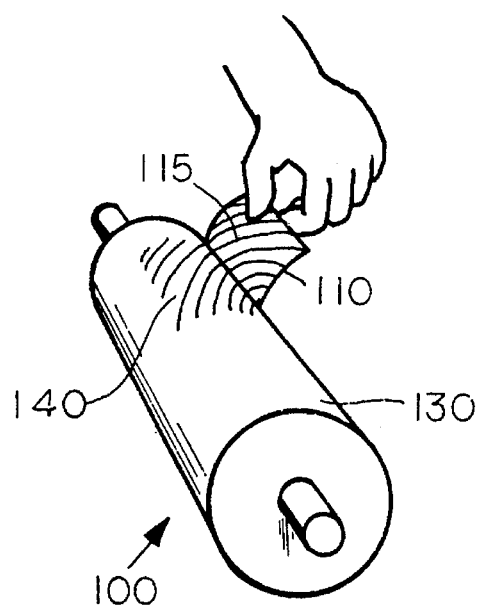
FIG. 3 is a perspective view of the embossing roll of FIG. 2 where the first positive printing master section is being removed from the outer surface of the embossing roll.

Once positive printing master section 110 has been completed, the artist is ready to prepare embossing roll 100. The artist positions first positive printing master section 110 on a flat surface, such as a table or workbench. As shown in FIG. 1, hardenable material 120 is applied evenly over textured surface 115 of first positive printing master section 110 with a spatula or other spreading tool. The preferred hardenable material (used in the present method) is Polyester #17 by Ad Tech Co. However, any two-part, high-temperature plastic system could be used in place of the Polyester #17. The artist then applies first positive printing master section 110 to outer surface 130 of embossing roll 100 using uniform pressure, thus compressing hardenable material 120 between textured surface 115 of first positive printing master section 110 and outer surface 130 of embossing roll 100, best shown in FIG. 2. Hardenable material 120 is allowed to harden, after which first positive printing master section 110 is peeled away from the hardened material, as shown in FIG. 3. Because of the inherent physical properties of hardenable material 120 and the material used for first positive printing master section 110, hardenable material 120 firmly adheres to outer surface 130 of embossing roll 100, but does not adhere to first positive printing master section 110. Thus, after the removal of first positive printing master section 110, first negative printing master region 140 remains, which is made up of a hardened material mold of the reverse imprint of the pattern originally contained on first positive printing master section 110.

Figure 4:
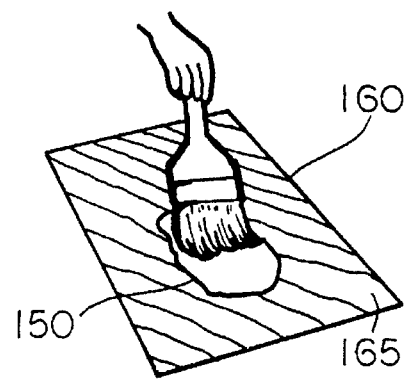
FIG. 4 is a perspective view of the second positive printing master section of the preferred method where a second amount of hardenable material is being applied to the second positive printing master section.
Figure 5:
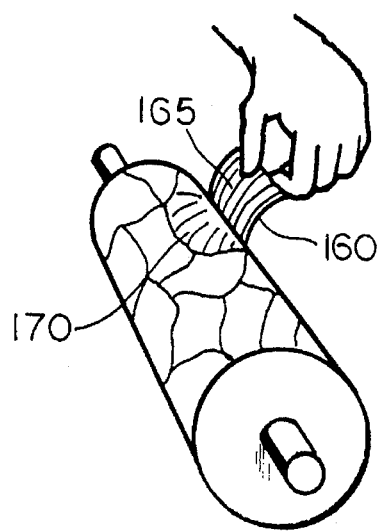
FIG. 5 is a perspective view of the embossing roll of the preferred method where the second positive printing master section is being removed from the outer surface of the embossing roll.

For the second phase of the process, the artist then creates second positive printing master section 160 (shown in FIG. 4) or reclaims first positive printing master section 110, either of which to be used in exactly the same manner as previously described. A second amount of hardenable material 150 is applied to either first positive printing master section 110 or second positive printing master section 160 and first or second positive printing master section 110 or 160 is applied to outer surface 130 of embossing roll 100 such that it slightly overlaps first negative printing master region 140. Hardenable material 150 is allowed to harden, and first or second positive printing master section 110 or 160 (whichever has been used) is again peeled away from the hardened material, whereby exposing second negative printing master region 170, as shown in FIG. 5. The slight overlap creates a seamless joint, or border, between first negative printing master region 140 and second negative printing master region 170. This sequence is repeated until entire outer surface 130 is covered with overlapping negative printing master regions, forming a negative printing master of hardened material firmly adhered to outer surface 130 of embossing roll 100. Embossing roll 100 may then be used in the conventional manner to imprint sheets of the wall or floor covering.

When the production run of a specific wall or floor covering is complete, it is a simple process to ready embossing roll 100 for reuse. The hardened material may be stripped from outer surface 130 using a lathe-like device, removed by immersing embossing roll 100 in a solvent bath which dissolves the hardened material, or removed by any equivalent process. Embossing roll 100 is then ready to use again.

Figure 6:
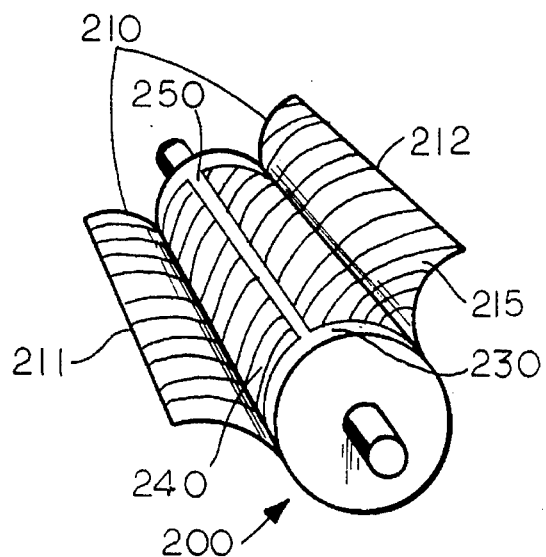
FIG. 6 is a perspective view of the embossing roll of an alternate method where a first positive printing master section is being removed from the outer surface of the embossing roll.
Figure 7:
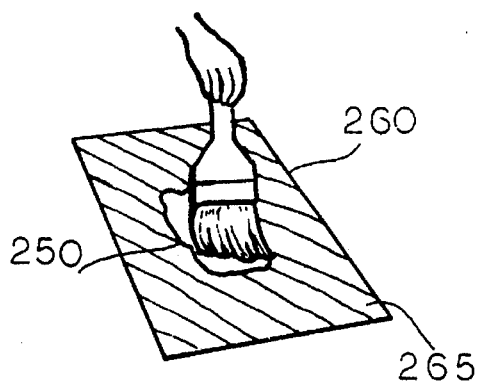
FIG. 7 is a perspective view of the second positive printing master section of the alternate method where a second amount of hardenable material is being applied to the second positive printing master section; and, FIG. 8 is a perspective view of the embossing roll of FIG. 6 where the second positive printing master section is being applied to the gap area.
Figure 8:
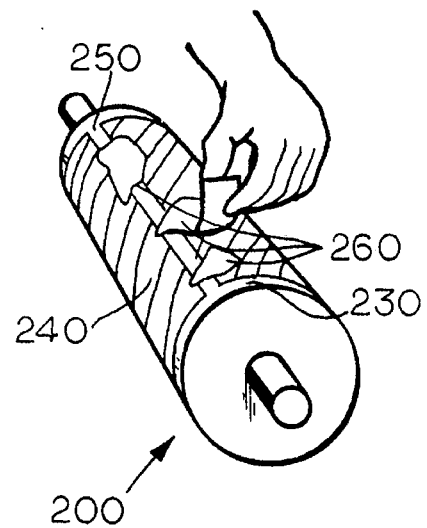

An alternate method of the direct applied embossing casting process is illustrated in FIGS. 6–8. In the process, first positive printing master section 210 has a leading edge 211 and a trailing edge 212, and is large enough to substantially cover the entire area of outer surface 230 of embossing roll A first amount of hardenable material (not shown) is applied to first positive printing master section 210 which is then applied to outer surface 230 of embossing roll 200, in a manner very similar to that previously described, such that leading edge 211 is proximate to trailing edge 212, defining a narrow strip of outer surface 230 of embossing roll 200, referred to as gap 250, not covered by first positive printing master section 210. After the first amount of hardenable material (not shown) is allowed to harden, first positive printing master section 210 is peeled away from the hardened material, exposing a negative printing master region 240 which substantially covers the entire area of outer surface 230 of embossing roll 200 except for aforementioned gap 250, best shown in FIG. 6.

In the second phase of the alternate method, a second amount of hardenable material 250 is applied to second positive printing master section 260, which is significantly smaller in surface area than first positive printing master section 210. Second positive printing master section 260 is applied to outer surface 230 of embossing roll 200 such that gap 250 is partially filled. This second phase of the process is repeated until gap 250 is completely filled, thus producing a seamless negative printing master of hardened material adhered to outer surface 230 of embossing roll 200. The steps for readying embossing roll 200 for reuse are identical to those previously described for the preferred embodiment.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A method of creating a seamless printing master for use with an embossing roll (100), said method comprising the steps of:
   a. applying a first amount of hardenable material (120) to the textured surface (115) of a first positive printing master section (110),
   b. applying said first positive printing master section (110) to the outer surface (130) of said embossing roll (100) such that said first amount of hardenable material (120) is compressed between said textured surface (115) of said first positive printing master section (110) and said outer surface (130) of said embossing roll (100);
   c. hardening said first amount of hardenable material (120);
   d. peeling off said first positive printing master section (110) from the hardened material on said outer surface (130) of said embossing roll (100) whereby exposing a first negative printing master region (140) having been imprinted in said hardened material on said outer surface (130) of said embossing roll (100);
   e. applying a second amount of hardenable material (150) to the textured surface (165) of a second positive printing master section (160);
   f. applying said second positive printing master section (160) to said outer surface (130) of said embossing roll (100) such that said second amount of hardenable material (150) is compressed between said textured surface (165) of said second positive master section (160) and said outer surface (130) of said embossing roll (100), said second positive printing master section (160) overlapping at least one previously formed negative printing master region on said outer surface (130) of said embossing roll (100);
   g. hardening said second amount of hardenable material (150);
   h. peeling off said second positive master section (160) from the hardened material on said outer surface (130) of said embossing roll (100) whereby exposing a second negative printing master region (170) having been imprinted in said hardened material on said outer surface (130) of said embossing roll (100); and
   i. repeating previous steps e)–h) in sequence until the entirety of said outer surface (130) of said embossing roll (100) is completely covered with the overlapping negative printing master regions, whereby forming a seamless negative printing master imprinted in said hardened material on said outer surface (130) of said embossing roll (100).

2. The method according to claim 1 wherein said second positive printing master section (160) of step e) comprises a reused said first positive printing master section (110).

3. The method according to claim 1 wherein said first positive printing master section (210) of step a) further comprises a leading edge (211) and a trailing edge (212).

4. The method according to claim 3 further comprising: applying said first positive printing master section (210) of step a) to said outer surface (230) of said embossing roll (200) such that said first positive printing master section (210) substantially covers the entire outer surface (230) of said embossing roll (200), whereby leaving a narrow gap (250) of said outer surface (230) of said embossing roll (200) uncovered between said leading edge (211) and said trailing edge (212) of said positive printing master section (210).

5. The method according to claim 4 further comprising: applying said second positive printing master section (260) of step e) such that said second positive printing master section (260) overlaps at least one of said leading edge (211) and said trailing edge (212) of said first positive printing master section (210) whereby covering at least a portion of said uncovered gap (250) of said outer surface (230) of said embossing roll (200).

6. The method according to claim 1 wherein the cumulative creation of negative master regions form a uniformly thick layer of hardened material circumjacent to said outer surface (230) of said embossing roll (200).

7. The method according to claim 1 wherein said textured surface (115) of said first positive printing master section (110) is identical to said textured surface (165) of said second positive printing master section (160).

8. A method of creating a seamless printing master for use with an embossing roll (100), said method comprising the steps of:
   a. applying an amount of hardenable material (120) to the textured surface (115) of a positive printing master section (110);
   b. applying said positive printing master section (110) to the outer surface (130) of said embossing roll (100) such that said amount of hardenable material (120) is compressed between said textured surface (115) of said positive printing master section (110) and said outer surface (130) of said embossing roll (100);
   c. hardening said amount of hardenable material (120);
   d. peeling off said positive printing master section (110) from the hardened material on said outer surface (130) of said embossing roll (100) whereby exposing a negative printing master region (140) having been imprinted in said hardened material on said outer surface (130) of said embossing roll (100); and,
   e. repeating previous steps a)–d) in sequence wherein each said positive printing master section overlaps at least one said negative printing master region until the entirety of said outer surface (130) of said embossing roll (100) is completely covered with the overlapping negative printing master regions, whereby forming a seamless negative printing master imprinted in said hardened material on said outer surface (130) of said embossing roll (100).

9. The method according to claim 8 wherein said first positive printing master section (210) of step a) further comprises a leading edge (211) and a trailing edge (212).

10. The method according to claim 9 further comprising: applying said first positive printing master section (210) of step a) to said outer surface (230) of said embossing roll (200) such that said first positive printing master section (210) substantially covers the entire outer surface (230) of said embossing roll (200), whereby leaving a narrow gap (250) of said 10 outer surface (230) of said embossing roll (200) uncovered between said leading edge (211) and said trailing edge (212) of said positive printing master section (210).

11. The method according to claim 10 further comprising: applying said second positive printing master section (260) of step e) such that said second positive printing master section (260) overlaps at least one of said leading edge (211) and said trailing edge (212) of said first positive printing master section (210) whereby covering at least a portion of said uncovered gap (250) of said outer surface (230) of said embossing roll (200).

12. A method of creating a seamless printing master for use with an embossing roll (100), said method comprising the steps of:
   a. applying a first amount of hardenable material (120) to the textured surface (115) of a positive printing master section (110);
   b. applying said positive printing master section (110) to the outer surface (130) of said embossing roll (100) such that said first amount of hardenable material (120) is compressed between said textured surface (115) of said positive printing master section (110) and said outer surface (130) of said embossing roll (100);
   c. hardening said first amount of hardenable material (120);
   d. peeling off said positive printing master section (110) away from the hardened material on said outer surface (130) of said embossing roll (100) whereby exposing a negative printing master region (140) having been imprinted in said hardened material on said outer surface (130) of said embossing roll (100);
   e. removing any residual hardened material from said textured surface (115) of said positive printing master section (110);
   f. applying a second amount of hardenable material (150) to said textured surface (115) of said positive printing master section (110);
   g. applying said positive printing master section (110) to said outer surface (130) of said embossing roll (100) such that said second amount of hardenable material (150) is compressed between said textured surface (115) of said positive master section (110) and said outer surface (130) of said embossing roll (100), said positive printing master section (110) overlapping at least one previously formed negative printing master region on said outer surface (130) of said embossing roll (100);
   h. hardening said second amount of hardenable material (150);
   i. peeling off said positive master section (110) from the hardened material on said outer surface (130) of said embossing roll (100) whereby exposing another negative printing master region (170) having been imprinted in said hardened material on said outer surface (130) of said embossing roll (100);
   j. removing any residual hardened material from said textured surface (115) of said positive printing master section (110); and,
   k. repeating previous steps f)–j) in sequence until the entirety of said outer surface (130) of said embossing roll (100) is completely covered with the overlapping negative printing master regions, whereby forming a seamless negative printing master imprinted in said hardened material on said outer surface (130) of said embossing roll (100).

13. The method according to claim 12 wherein said first positive printing master section (210) of step a) further comprises a leading edge (211) and a trailing edge (212).

14. The method according to claim 13 further comprising: applying said first positive printing master section (210) of step a) to said outer surface (230) of said embossing roll (200) such that said first positive printing master section (210) substantially covers the entire outer surface (230) of said embossing roll (200), whereby leaving a narrow gap (250) of said outer surface (230) of said embossing roll (200) uncovered between said leading edge (211) and said trailing edge (212) of said positive printing master section (210).

15. The method according to claim 14 further comprising: applying said second positive printing master section (260) of step e) such that said second positive printing master section (260) overlaps at least one of said leading edge (211) and said trailing edge (212) of said first positive printing master section (210) whereby covering at least a portion of said uncovered gap (250) of said outer surface (230) of said embossing roll (200).

* * * * *